April 29, 1969     L. H. WALBRIDGE     3,441,356

PULSED SPARK GAS IGNITION AND FUEL CONTROL SYSTEM

Filed Sept. 12, 1967

INVENTOR.
LYMAN H. WALBRIDGE

ATTORNEYS

April 29, 1969 L. H. WALBRIDGE 3,441,356
PULSED SPARK GAS IGNITION AND FUEL CONTROL SYSTEM
Filed Sept. 12, 1967 Sheet 3 of 3

INVENTOR.
LYMAN H. WALBRIDGE
BY
ATTORNEYS 3,441,356
PULSED SPARK GAS IGNITION AND FUEL
CONTROL SYSTEM
Lyman H. Walbridge, Ashland, Mass., assignor to Fenwal
Incorporated, Ashland, Mass., a corporation of
Massachusetts
Filed Sept. 12, 1967, Ser. No. 667,254
Int. Cl. F23n 5/00
U.S. Cl. 431—66                                             8 Claims

ABSTRACT OF THE DISCLOSURE

The application discloses a control system for a fuel burner including fuel supply means and ignition electrodes. The electrodes are excited by a spark-producing pulse of essentially unipolar voltage each time a switch in the pulse forming circuit is closed. The switch is periodically closed by a circuit responsive to pulses produced by a control pulse generator when power is first applied to the circuit and the control pulses are supplied for a time period sufficient to establish a flame. The control circuit is so arranged that it will cease to fire the switch after a time sufficient for ignition unless a condition sensing signal supplied by a circuit responsive to a condition which measures the performance of the burner is present. The fuel supply means acts to supply fuel to the burner in response to repeated closing and opening of the switch. The full specification should be consulated for an understanding of the invention.

My invention relates to fuel burners, and particularly to a novel pulsed spark ignition and fuel control system for fuel burners.

Background of the invention

Extensive efforts have been directed toward the development of ignition and fuel control systems for fuel burners such as gas and oil burners and the like. The primary requirements of such systems are safety and reliability. Secondary, though quite important requirements are reasonable cost and physical size of the system, and, for electrical ignition systems, an acceptably low output of electromagnetic radiation at radio frequencies. Many systems have been devised which meet some of these requirements, and all that have been adopted for use are relatively safe and reliable. However, in the past these requirements could be met only at substantial expense and circuit complexity.

The basic problem is that a relatively large number of functions must be performed in order to safely ignite fuel at a burner and control the supply of fuel to the burner after ignition. For example, it is desirable to interrupt the fuel supply if the ignition system fails after a flame is established, so that a subsequent loss of flame cannot result in a dangerous accumulation of unburned fuel. However, many electrical ignition systems produce such a high level of radio frequency interference that it is essential to turn off the ignition as soon as flame has been established. Thus, if the integrity of the ignition system is to be monitored during operation of the burner, additional apparatus must be included for the purpose. Numerous other problems arise from the different conditions prevailing prior to ignition and after ignition. In general, these problems have been solved by the use of two sets of apparatus and switching means actuated by some form of flame detector for setting up a pre-ignition control system and a post-ignition monitoring system.

The objects of my invention are to reduce the complexity and cost of apparatus required for ignition monitoring and fuel control, without sacrificing reliability and safety.

Summary of the invention

Briefly, the above and other objects of my invention are attained by a novel control system for a fuel burner provided with a fuel control such as a valve for admitting fuel to the burner. The apparatus of my invention includes a pair of ignition electrodes, and an ignition pulse generator for supplying spaced pulses of unipolar voltage having a low energy content to the electrodes. The pulse generator is controlled by an electronic switch, preferably a silicon-controlled rectifier, and is arranged to produce one ignition pulse each time the switch is closed. The fuel supply is controlled by a relay having a winding connected in a circuit that will supply energizing current to the winding only if the switch is repeatedly opened and closed. Thus, the operation of the ignition circuit is a necessary preliminary to the supply of fuel to the burner.

A control circuit is provided for the switch to periodically close it and then open it at intervals sufficient to keep the relay energized if the predetemined conditions exist. To this end pulses are supplied to the control circuit. However, the control circuit is so arranged that the pulses for closing the switch will be shut off after a period of time sufficient to establish ignition unless a condition-sensing signal is present.

The condition-sensing signal (or signals) is generally supplied from a spark or flame sensor having a very high output impedance. If conventional gating techniques for silicon-controlled rectifiers were used, circuits to effectively use the high impedance condition-sensing signal would be complex and expensive.

I have found that controlled gating of the silicon-controlled rectifier can be achieved if control pulses of short duration, which are, as mentioned above, supplied for only a short period in the absence of a condition-sensing signal, are supplied to the electronic switch. The high impedance condition sensing signal is then integrated over the relatively long control pulse period and used to determine whether the next subsequent control pulse is supplied to the switch.

Signal from other sources may be mixed with the condition-sensing signal to perform sequencing and timing functions if desired.

The circuit of a first embodiment of my invention is designed to "prove" that sparking is taking place at the electrodes. Relatively minor modifications and additions to this circuit enable the circuit to also "prove" that the electrodes are bathed in flame, all as will be described below. The first two embodiments of my invention utilize a negative condition sensing signal. In a third embodiment, I illustrate how a positive condition sensing signal may be used to prove that sparking is taking place at the electrodes.

The condition sensed by the circuits of my invention is, in general, the flow of current between the ignition electrodes although the flame itself or the temperature of the space heated by the flame may be monitored. If the burner is operating as intended, the condition sensing signal will be produced, and in combination with the other signals present will cause the switch to continue to be operated periodically.

The circuits of my invention test the ignition system before the fuel is turned on. Operation of the burner is monitored after the fuel supply has been turned on with the ignition system still functioning and the supply of fuel is still conditioned on the proper operation of the ignition system.

The apparatus of my invention, and its mode of operation will best be understood from the following detailed description, together with the accompanying drawings in which:

*Detailed description*

Figure 1:
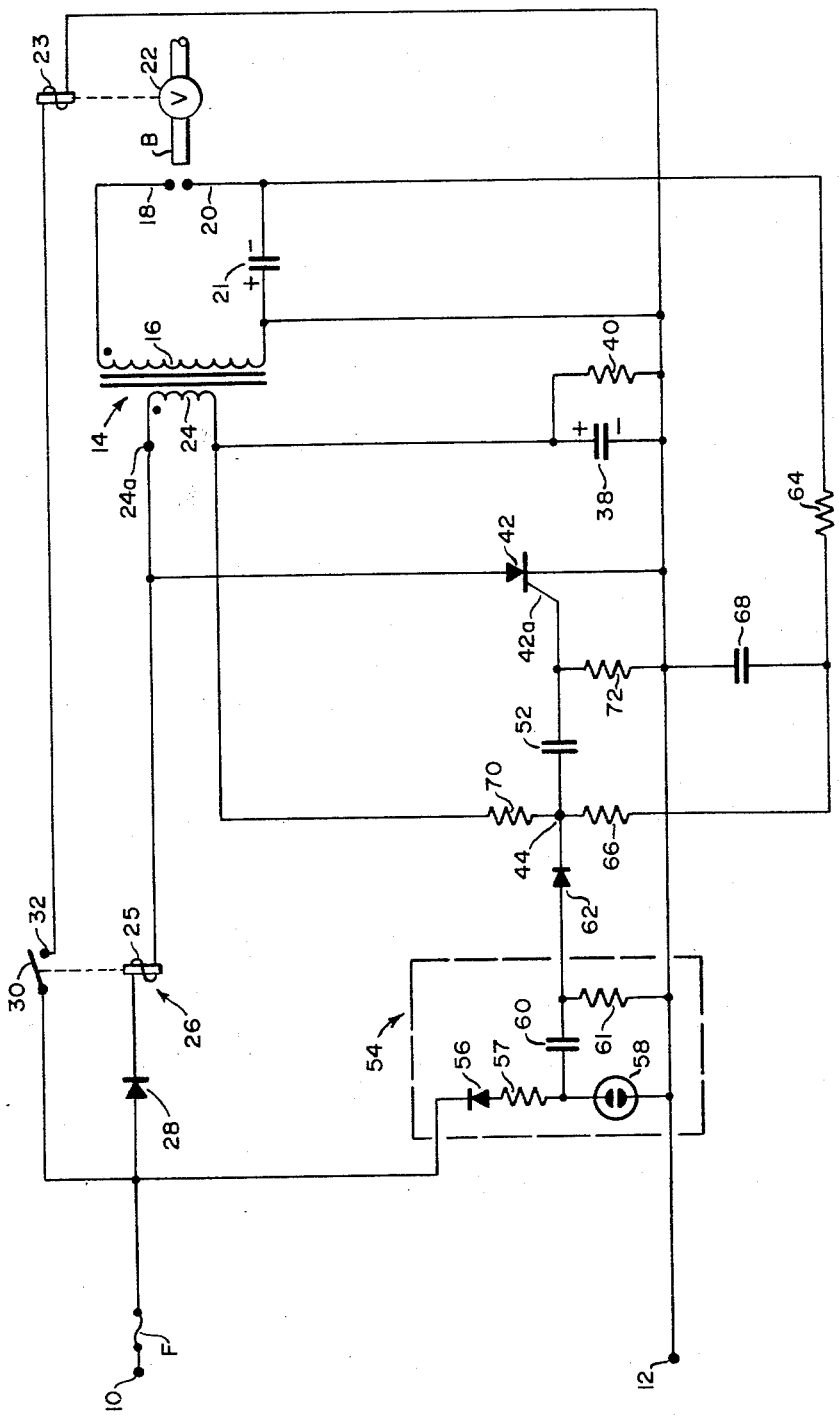
FIGURE 1 is a schematic diagram of the circuit of a preferred embodiment of my invention arranged to monitor sparking at the electrodes.

As shown in FIGURE 1, the ignition and fuel control system of my invention includes a pair of terminals 10 and 12 which are to be connected to a source of alternating voltage typically 60 cycle, 115 volt r.m.s. amplitude. For purposes of exploration the terminal 12 may be considered as the reference terminal all other voltages in the circuit being measured with respect to terminal 12. The fuse F is provided to protect the circuit in case of short circuits, failure of components necessary for circuit operation, etc.

A pulse transformer generally indicated at 14 is provided, having a secondary winding 16, one terminal of which is connected to one of the spark ignition electrodes 18; the other secondary terminal of the pulse transformer secondary winding is grounded (i.e. connected to the terminal 12). The other spark electrode 20 is also connected to ground through the capacitor 21. The electrodes 18 and 20 are positioned to ignite fuel and air issuing from burner B. The fuel supply to the burner B is controlled by a solenoid operated valve 22, whose solenoid is indicated at 23.

As is explained in my U.S. Patent No. 3,277,949 issued to the assignee of this application on October 11, 1966, a capacitor located as is capacitor 21 will be charged by the current flowing between the ignition electrodes as a result of sparking. In the embodiment illustrated in the cited patent, the transformer primary was excited by an alternating voltage and it was necessary to rectify the spark current supplied to the capacitor. In the present circuit, the primary of the transformer is excited by unipolar pulses and accordingly, rectification is unnecessary.

The primary winding 24 of the pulse transformer is connected to the terminal 10 through the winding 25 of the relay generally indicated at 26 and through the diode 28 which is polarized as shown. The contacts 30 and 32 of the relay 26, when closed, supply power to the solenoid 23 of the solenoid valve 22 which controls the fuel supply to the burner.

The other side of the primary winding 24 of the pulse transformer 14 is connected to ground through the capacitor 38. It will be apparent that this circuit will be effective to operate the relay 26 and supply fuel to the burner on half cycles of the supply voltage in which terminal 10 is positive with respect to terminal 12, provided the capacitor 38 is periodically discharged, but that the relay 26 will not be operated if capacitor 38 is not periodically discharged. A resistor 40 is provided in parallel with capacitor 38 to discharge it in the event that power to the system is interrupted for a short period when capacitor 38 is charged.

In operation the capacitor 38 is periodically discharged by the firing of a solid state electronic switch, here shown as the preferred silicon-controlled rectifier 42 which is connected between terminal 24a of the primary winding of the pulse transformer 14 and ground. The firing of the switch 42 is controlled by pulses supplied to its gate terminal 42a. The gate 42a is connected to the junction 44 through the capacitor 52 whose function will be explained below.

Pulses for firing of the switch 42 on each half cycle of the line voltage in which the terminal 10 is negative with respect to the terminal 12 are supplied by the pulse generator generally indicated at 54. The pulse generator includes a diode 56, poled as illustrated and connected in series with a resistor 57 and a neon bulb 58 to ground. Pulses appearing at the junction of the resistor 57 and neon bulb 58 as a result of breakdown on the neon bulb are coupled through the capacitor 60 and the diode 62 to the junction 44. The condition monitoring signal from the capacitor 21 is also supplied to the junction 44 through resistors 64 and 66. The capacitor 68 connected between junction of these two resistors increases the time constant of integration for condition sensing signal over the control pulse period. Additionally, the voltage appearing across capacitor 38 is applied to the summing junction through the resistor 70 for purposes to be hereinafter explained.

A resistor 72 is connected between the gate terminal 42a of the electronic switch 42 and ground to prevent inadvertent firing of the switch at high ambient temperatures in the absence of a trigger pulse, or (in a given cycle) prior to the reception of a trigger pulse.

*Operation*

The circuit illustrated in FIGURE 1 operates as follows. On the first half cycle of the supply voltage after power is applied to the circuit in which terminal 10 is positive with respect to terminal 12 (hereinafter termed a "positive" half-cycle) the capacitor 38 will charge with the polarity shown to a value approaching the peak of the supply voltage, its charging current being drawn through diode 28 and the winding 25 of relay 26.

On the negative half cycle of the line voltage following this first positive half cycle, the voltage across neon bulb 58 will rise until it reaches approximately 90 volts, at which time the neon tube will fire and the voltage across it will drop to about 60 volts where it will remain until the current drops below the sustaining value, at which time the neon bulb will be extinguished. This sharp rise in voltage (in the positive direction) is coupled to the gate 42a of the switch 42, appearing there as a positive trigger pulse. Since the anode of the switch 42 is positive with respect to its cathode by reason of the charge on capacitor 38, the electronic switch 42 fires, discharging capacitor 38 through the primary winding 24 of the pulse transformer 14. Because of the current direction through the transformer and the polarity of the primary and secondary windings, as indicated by the conventional dots, a large negative pulse appears across the secondary winding 16 of the pulse transformer. This negative pulse may be followed by a positive pulse of substantially reduced amplitude; the positive pulse is generally insufficient to break down the gap and therefore has no effect on circuit operation. The positive pulse may be eliminated by connecting a diode across the primary winding 24 of pulse transformer 14. The negative pulse causes a spark to occur between the electrodes 18 and 20 and the capacitor 21 to charge in the direction indicated.

The foregoing operation will be repeated on successive cycles of the line voltage. After a few such cycles the average current through the winding 25 of relay 26 will be sufficient to cause the relay to operate and open the fuel supply valve 22. With fuel admitted to the burner and sparking taking place between the electrodes, ignition should occur.

If, for some reason sparking is not taking place between the electrodes, no voltage will appear across capacitor 21. Under this circumstance, the positive pulses supplied through diode 62 to the junction 44 and from the junction to the gate 42a of the electronic switch 42 will cause a positive bias to build up at the junction 44 across capacitor 52. This positive bias will back bias the diode 62 and prevent further triggering pulses from reaching the gate terminal 42a of the switch 42. The absence of triggering pulses will, as previously noted, result in capacitor 38 remaining charged to the peak supply voltage. Thus no current will flow through the winding 25 of relay 26 and the gas supply to the burner will be shut off. Thus the presence of the integrated spark-sensing signal from capacitor 21 is necessary to maintain continued burner operation.

The potential at the junction 44, in operation, is close to ground. If the electrodes 18 and 20 were shorted or if terminal 20 were grounded, the junction would be grounded and the circuit, as so far described, would continue to operate, even though ignition could not take place. To protect against the hazard of large amounts of unignited gas in the vicinity of the burner, the positive voltage appearing across capacitor 38 is also supplied to the junction 44 via resistor 70. In the absence of the integrated negative condition sensing voltage, appearing across capacitor 65, the voltage on capacitor 38 will be sufficiently high to back bias diode 62 and prevent pulses from being supplied to the switch 42, thus insuring that relay 26 will drop out, and remove the gas supply to the burner.

In a practical embodiment of my invention as exemplified by the circuit of FIGURE 1, the following values were used:

Resistors:
| | | |
|---|---|---|
| 40 | ohms | 220K |
| 57 | do | 22K |
| 61 | do | 2.2K |
| 66 | megohms | 4.7 |
| 64 | do | 4.7 |
| 70 | do | 15 |
| 72 | ohms | 1K |

Capacitors:
| | | |
|---|---|---|
| 21 | mfd | 0.022 |
| 38 | mfd | 1.5 |
| 60 | mfd | 0.005 |
| 52 | mfd | 0.05 |
| 68 | mfd | 0.02 |

Fuse F—slow blow _____ amperes__ 0.062
Neon lamp 58 _____ Type NE-83
Silicon-controlled rectifier 42 _____ Type C106B2

Diodes:
28 _____ Type T56
56 _____ Type TS4
62 _____ Type S1164

Figure 2:
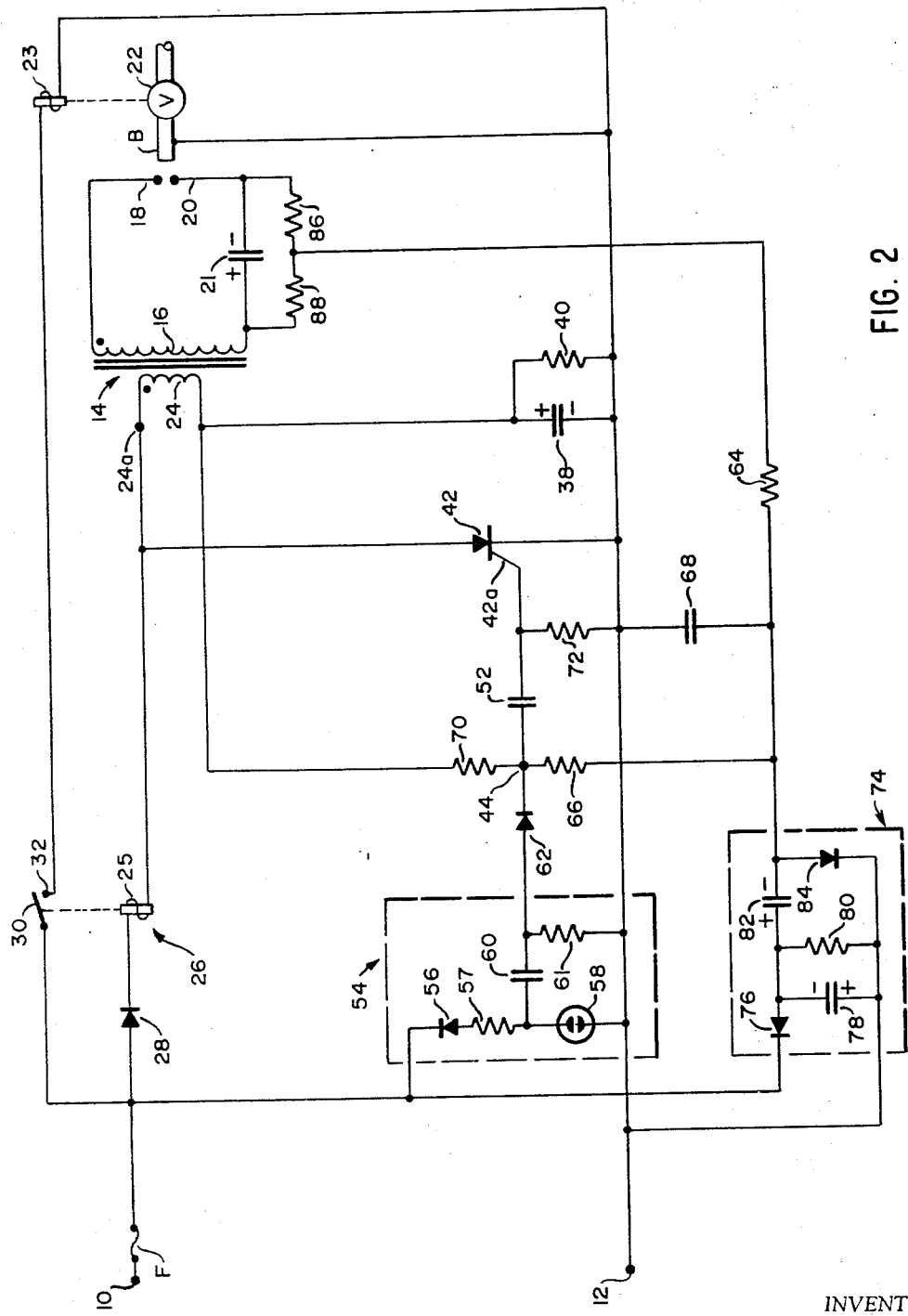
FIGURE 2 is a schematic diagram which illustrates how the circuit of FIGURE 1 may be modified to monitor flame at the electrodes as opposed to sparking.

FIGURE 2 illustrates the circuit of FIGURE 1 modified for monitoring spark and flame rather than spark alone. Since sparks must be produced until flame is present, and since the condition sensing circuit provides a signal only when flame is present, it is necessary to provide a substitute for the negative condition monitoring signal for a short period until flame is actually present in the circuit of FIGURE 2. This is achieved by the circuit generally indicated at 74.

The circuit 74 includes a diode 76 poled as shown and connected through the fuse F to the terminal 10. This diode passes negative half cycles of the A.C. source, which are filtered by the capacitor 78 and the resistor 80. These three elements, the diode 76, capacitor 78, and the resistor 80 form a conventional negative D.C. voltage source. The negative direct voltage from this source is coupled to the junction 44 through the capacitor 82 and the resistor 66. A diode 84 is provided for reasons to be explained below.

When power is first supplied to the circuit of FIGURE 2, the capacitor 82 is uncharged. Accordingly, the negative potential generated by the power supply is initially coupled to the junction 44 where it provides the necessary negative bias to prevent the diode 62 from becoming back-biased. However, with the passage of time the capacitor 82 becomes charged, with the polarity shown, to the negative potential supplied by the source. If the integrated condition sensing signal from the capacitor 68 has not appeared by the time capacitor 82 becomes sufficiently charged so that diode 62 becomes back biased, the supply of trigger pulses to the gate terminal of the electronic switch 42 will be removed, and the gas supply to the burner will be interrupted as previously described.

The diode 84 serves to discharge capacitor 82 whenever power to the terminals 10 and 12 is interrupted, so that when power is again applied, ignition can again take place.

It will also be observed that the sensing circuit of FIGURE 1 has been modified so that the circuit senses the presence of flame rather than the presence of sparks at the terminals 18 and 20. In particular the lower end of the winding 16 and the positive side of the capacitor 21 are no longer connected to terminal 12. Rather, a pair of resistors, 86 and 88 are connected in parallel with the capacitor 21 and a connection is made between the junction of these resistors and the one end of resistor 64. An electrically conducting portion of the burner fuel supply pipe is connected to terminal 12.

In operation, capacitor 21 becomes charged in the manner previously discussed. However, in the absence of flame the voltage appearing across capacitor 21 is not available as a condition sensing signal because there is no connection to the reference potential. The resistors 86 and 88 and the impedance between electrodes 18 and 20 in the presence of flame form a bridge circuit. The impedance between each of the electrodes and the burner may be represented by a resistor partially shunted by a diode, the diode being poled so that its cathode terminal is on the burner. When no flame is present half the bridge is not present.

Because of the polarity of the charge on capacitor 21 and therefore of electrode 18 with respect to the reference potential, the impedance between terminal 18 and the burner (and therefore the reference potential) in the presence of flame is relatively low as compared with electrode 20. Thus, the voltage across the capacitor 21 becomes available to provide a condition sensing signal in the presence of flame. This voltage prevents diode 62 from becoming back biased, with the result that the switch 42 is repeatedly triggered, capacitor 38 is regularly discharged and relay 25 is operated to maintain a supply of gas to the burner.

Thus, by the addition of the power supply generally indicated at 74 and the two resistors 86 and 88 and a slight reconnection of the circuit, the spark-sensing circuit of FIGURE 1 may be modified to the spark and flame sensing circuit of FIGURE 2. The resistor 86 may be replaced with a conductor if the leakage impedance in the absence of flame between electrodes 18 and 20 and the burner is not a factor of which account must be taken in operation of the circuit. Also, if it is not desired to prove spark and flame, but only flame the voltage supplied by capacitor 21 might be supplied by a battery or other conventional voltage source.

Figure 3:
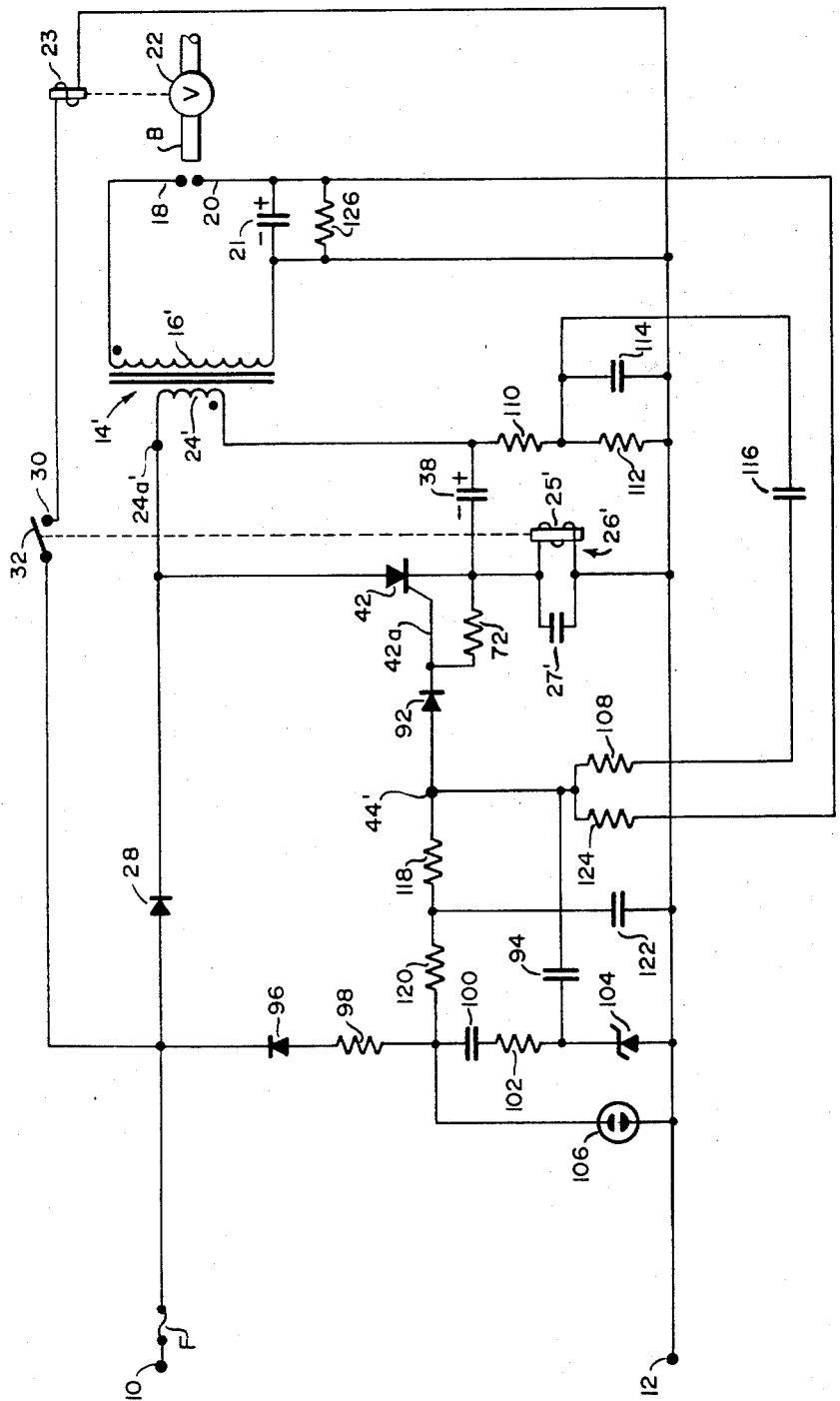
FIGURE 3 is a schematic diagram which illustrates an alternative embodiment of my invention for monitoring sparking at the electrodes using positive rather than negative condition sensing signals.

In FIGURE 3, I have illustrated another embodiment of my invention for proving spark. In this embodiment the condition sensing signal appearing across the capacitor 21 is positive rather than negative. This is accomplished by reversing the sense of the transformer windings as indicated by the conventional dots on the circuit diagram. Additionally the circuit of FIGURE 3 uses pulses of a controlled amplitude insufficient, in the absence of a positive bias to gate the silicon-controlled rectifier 42 into conduction. Finally, this circuit illustrates that after operation has begun a further signal may be supplied to the junction to render the entire circuit more sensitive.

The pulsing circuit of FIGURE 3 is identical to that shown in FIGURES 1 and 2 except that, as mentioned above, the polarity of the windings is reversed. For this reason the reference characters designating the pulse transformer and its parts have been primed.

As can be seen in FIGURE 3, the junction 44′ is connected through a diode 92 to the gate 42a of the silicon-controlled rectifier 42. Four signals are at times applied between the junction 44' and ground. The first signal is applied through the capacitor 94 to the junction and is produced by a control pulse generator, next to be described.

The control pulse generator includes a circuit extending from input terminal 10 through a diode 96, a resistor 98, a capacitor 100, another resistor 102, and a Zener diode 104 to the terminal 12. A neon bulb 106 is connected between ground and the junction of the resistor 98 and the capacitor 100.

During half cycles of the line voltage in which terminal 10 is negative with respect to ground, the capacitor 100 is charged through the resistors 98 and 102 in series. The time constant of this circuit is made such that at approximately half way through the negative cycle, the voltage across the capacitor 100 will be sufficient to break down the neon bulb 106 causing the capacitor to be discharged through the neon bulb, the resistor 102 and the Zener diode 104 in the breakdown direction. The diode 104 will conduct in the reverse direction, and a positive-going pulse with respect to ground will be applied to the junction 44' through capacitor 94. This pulse is limited in amplitude by the Zener diode to a value below the cathode bias of the silicon controlled rectifier 42. This cathode bias is provided by the voltage on capacitor 27', which voltage is required to cause operation of relay 26'. Hence, in the absence of other signals applied to junction 44', the control pulse cannot repeatedly gate the silicon controlled rectifier into conduction.

As previously noted, when the neon tube 106 conducts, the voltage across it will fall from the value at which the tube goes into conduction to a lower constant value. As long as the tube current is above the sustaining current, the tube will continue to conduct and maintain a constant voltage at the junction of the resistor 98 and the capacitor 100.

For the purposes of operation in the manner just described, the size of the capacitor 100 is determined primarily by the pulse energy required to gate the controlled rectifier into conduction. The resistor 102 is selected to protect the Zener diode 104 and the neon tube 106, and has a small resistance relative to that of the resistor 98. Thus, the time constant of the control pulse generator is essentially determined by the resistor 98 and the capacitor 100.

A bias signal in the proper sense and sufficient in amplitude to gate the controlled rectifier into conduction when the pulses are produced by the pulse generator is applied to the junction 44' through the resistor 108. This signal is applied for a short time after energization of the system to permit ignition sparks to be produced before the condition sensing signal, to be described, is available. This signal corresponds to the signal produced by the power supply 74 of FIGURE 2. Such a circuit was not necessary in the circuit of FIGURE 1 in which the junction 44 operated at about ground potential. The signal is produced only when the capacitor 38 is repeatedly charged and discharged during the first few cycles of the line voltage, and thus serves as a preliminary check on the operation of the ignition system.

This second signal is produced by a filter circuit comprising a potential divider including two resistors 110 and 112 connected in series between the upper terminal of the capacitor 38 and ground. A capacitor 114 is connected in parallel with the resistor 112. The junction of the resistor 110 and 112 is connected to the junction 44' through a capacitor 116 in series with the resistor 108.

When the capacitor 38 is charged and discharged the first few times, the potential at the junction of the resistor 110 and 112 rises rapidly. In response to this rise in potential, current flowing through the capacitor 116 and the resistor 108 produces a signal including a positive voltage component at the junction 44'. After a few cycles of line voltage, this signal will decay; the components of the filter are selected so that the ripple component of the steady-state voltage across the resistor 112 will not contribute appreciably to the potential at the junction 44'.

A third signal is supplied to the junction 44' through a resistor 118, from a time delay network. The time delay network comprises a resistor 120 connected in series with a capacitor 122 between ground and the junction of the resistor 98 and the capacitor 100. The capacitor 122 will be charged through the resistor 120 in series with the resistor 98 during half cycles when terminal 10 is negative with respect to ground. The capacitor 122 will discharge at times through the resistors 118 and 108 and the capacitor 116. Another discharge path extends through the resistors 124 and 126 and the capacitor 21. Thus, the net voltage across the capacitor 122, and consequently the signal supplied to the junction 44', is determined by the currents flowing through the resistors 120 and 118.

The time constant of the time delay circuit including the resistor 120 and the capacitor 122 is selected to be long with respect to the period of the voltage applied to the terminals 10 and 12. For example, at 60 cycles it might be one second.

The voltage across the capacitor 122, gradually becoming more and more negative, is applied to the junction 44' through the resistor 118. After a period sufficient to enable ignition at the burner B if everything is working properly, the voltage supplied by the capacitor 122 will be sufficiently great to prevent the control pulse generator from gating the controlled rectifier into conduction unless another signal is also supplied to the junction 44'.

The final signal supplied to the junction 44' is a measure of proper operation of the burner. As previously explained, it might be provided by a thermocouple, photoelectric cell, or other means sensing the temperature or other measure of the flame. In the embodiment shown in FIGURE 3 it is the measure of the spark current between the electrodes 18 and 20. As noted, when these electrodes are conducting current, the capacitor 21 will be charged, and a positive signal with respect to terminal 12 will be supplied to the junction 44' through the resistor 124. The capacitor 21 is connected in parallel with a resistor 126; the purpose of resistor 126 is to discharge capacitor 21 so that the condition sensing signal will indicate failure of ignition relatively soon after sparks have ceased to flow between the electrodes. If correct operation of the electrode circuit is sensed by the capacitor 21, a positive voltage will appear across it of sufficient amplitude to drive down the steady-state voltage across the capacitor 122 and bring the junction 44' to a potential sufficiently high so that when the controlled amplitude pulses are applied to the junction, they will gate the controlled rectifier into conduction.

Operation of the apparatus of FIGURE 3 will be generally apparent from the above description. However, a brief general description of its operation is given for the convenience of the reader.

Assume that line voltage is applied to the terminals 10 and 12 at a time when the terminal 10 is going positive. During the first such positive half cycle, the capacitor 38 will be charged and a half cycle of energizing current will be applied to the winding 25' of the relay 26'. The relay is designed so that a number of such cycles are necessary to close the front contacts 30 and 32 of the relay.

During the first positive half cycle, the capacitor 114 will also charge, and a positive voltage will be coupled through the capacitor 116 to the junction 44'. This voltage will persist through the first few line cycles, and gradually decay. For purposes of illustration, assume that a voltage in the neighborhood of 2 volts at the gate 42a with respect to the cathode of SCR42 is required for operation. If the Zener diode 104 breaks down at 6 volts, and the cathode bias determined by relay pull-in is 15 volts, the time constants would be selected to keep the bias level with respect to the reference supplied through the capacitor 116 above about 15+2—6=11 volts for at least the first few cycles of line voltage.

During the next succeeding negative half cycle, the capacitor 100 will be charged, until the neon tube 106 breaks down and a pulse of current is supplied to the junction 44' through the capacitor 94. With the other values assumed for purposes of illustration, the neon tube might be selected to break down at 90 volts and fall to a constant value of 60 volts. The amplitude of the pulse supplied through the capacitor 94 is determined by the breakdown potential of the Zener diode 104, of, for example, 5 or 6 volts.

The controlled recifier 42 will be gated on by the pulse from the control pulse generator in combination with the bias signal from the capacitor 116, causing the capacitor 38 to be discharged through the primary winding 24' of the transformer 14'. A unidirectional pulse will be applied to the electrodes 18 and 20, causing them to produce a spark and causing a charge to begin to accumulate on capacitor 21. The controlled rectifier 24 will return to its nonconducting state when the voltage across its anode and cathode goes to zero. Meanwhile, the capacitor 122 will begin to charge, but its charge will not be sufficiently large to have any effect on the circuit.

Operation will continue on the succeeding cycles in the same manner just described, and if everything is working properly, the relay 26' will be energized and energize the valve solenoid 23 to open the valve 22. The capacitor 21 will charge to a relatively high positive value, for example, 100 volts. The result will be that the capacitor 122 will ultimately assume a relatively low voltage of, for example, +10 volts, caused by the balance of charging current flowing through the resistor 120 and discharge current flowing through the resistors 118 and 124. The net bits voltage at the junction 44' will be at about 11 volts, so that the pulse supplied by the control pulse generator will raise the potential at the junction 44' to a level sufficient to supply gate current to the controlled rectifier.

Should sparks cease to flow between the electrodes 18 and 20, the capacitor 21 will be discharged and the silicon controlled rectifier 42 will no longer be gated into conduction. The capacitor 122 will charge to a relatively high negative voltage, bringing the junction 44' to a negative potential to ensure that the control pulse generator cannot effect gating. The capacitor 38 will charge to a maximum value, and prevent energization of the relay 26', so that the latter will drop out and close the fuel supply valve 22.

The capacitor 21 checks not only that current is flowing between the electrodes, but that neither is grounded, and that they are spaced from each other. If the electrode 18 is grounded, no output pulse will be produced across the secondary winding 16'. If the electrode 20 is grounded, the capacitor 21 cannot charge. If the electrodes are connected together, any charge on the capacitor would be dissipated through the secondary winding of the transformer.

While many different and suitable values for the electronic components of the apparatus of my invention can be selected in a manner that will be apparent to those skilled in the art, the following values were used in a practical embodiment of FIGURE 3.

Resistors:
```
    98, 110 and 118 _____ 100K ohms.
    102, 72 _____ 1K ohms.
    120 _____ 10 megohms.
    108, 124 _____ 2.2 megohms.
    126 _____ 3.3 megohms.
    112 _____ 1.0 megohms.
```
Capacitors:
```
    100 _____ .022 mfg. 200 v.
    94 _____ .01 mfg. 100 v.
    122 _____ .1 mfg. 100 v.
    38 _____ 1.5 mfg. 200 v.
```

Capacitors:
```
    21 _____ .022 mfg. 400 v.
    114 and 116 _____ 0.1 mfg. 200 v.
```
Diodes:
```
    28 and 96 _____ Type TS4.
    104 _____ Zener type 1N752, 5.6 v.
    92 _____ Type 1N538.
```
Silicon controlled
```
    rectifier 42 _____ Type C106B1.
```
Neon bulb 106 _____ Type NE8.
Fuse F _____ .062 amp. slow-blowing.

While I have described my invention with respect to the details of various embodiments thereof, many changes and variations will be apparent to those skilled in the art upon reading my description, and such can obviously be made without departing from the scope of my invention.

Having thus described my invention, what I claim is:

1. A fuel and ignition control system for a fuel burner said fuel burner having associated therewith means operable to supply fuel to the burner and a spark ignitor operable by an applied voltage pulse to produce a spark for igniting fuel emitted from the burner, said system comprising in combination an electronic switch having a control terminal, ignition pulse generating means operable when energized to supply a pulse to said spark ignitor when said electronic switch is closed, means responsive to repeated opening and closing of said electronic switch for operating the fuel supply means to supply fuel to the burner, control pulse generating means, means connecting pulses from said control pulse generating means to the control terminal of said switch, means preventing said control pulses from closing said switch at a predetermined time after energization of said system in the absence of a condition sensing signal, means responsive to a predetermined condition in the region adjacent the burner to provide a condition sensing signal, and means connecting said condition sensing signal to said preventing means to thereby permit said control pulses to close said electronic switch after said predetermined time.

2. The apparatus of claim 1, in which said spark ignitor comprises a pair of spaced electrodes mounted adjacent the burner, said pulse generating means comprises a pulse transformer having a secondary winding excited by a pulse when said switch is closed, said condition responsive means comprises a capacitor connected in series with said electrodes and said secondary winding, and said capacitor is connected to said preventing means.

3. The apparatus of claim 1 in which said condition sensing signal is dependent upon sparking in the vicinity of said spark ignitor.

4. The apparatus of claim 1 in which said condition sensing signal is dependent upon flame in the vicinity of said spark ignitor.

5. The apparatus of claim 1 in which said means for preventing said control pulses from closing said switch includes a diode connected to said control pulse generator, a capacitor connected to said switch control terminal, and means connecting said diode and capacitor in series whereby, in the absence of a condition sensing signal, said capacitor will back bias said diode after a predetermined number of control pulses thereby preventing further control pulse transfer to the control terminal of said switch, said condition sensing signal being connected to the junction of said diode and said capacitor.

6. The apparatus of claim 1 in which said means for preventing said control pulses from closing said switch includes a diode connected to said switch control terminal, a capacitor connected to said control pulse generator and means connecting said diode and capacitor in series, means other than said condition sensing signal for biasing said diode for forward conduction for a predetermined period after power is first supplied to said system, said control pulses being of insufficient amplitude to energize said electronic switch in the absence of said bias, and means connecting said condition sensing signal to the junction of said capacitor and said diode, said condition sensing signal, when present, forward biasing said diode.

7. The combination defined in claim 1 which includes means for providing a signal substantially equal in amplitude and polarity to said condition sensing signal to said preventing means for a predetermined period after power is first supplied to said system where said preventing means will supply said pulses to said switch for a predetermined time.

8. The apparatus of claim 1 in which said condition sensing signal is dependent upon sparking and upon flame in the vicinity of said spark ignitor.

References Cited

UNITED STATES PATENTS

| | | | |
|---|---|---|---|
| 1,755,390 | 4/1930 | Fischer et al. | 431—66 |
| 2,358,166 | 9/1944 | Isserstedt | 431—66 |
| 2,675,069 | 4/1954 | Shottenfeld | 431—66 |
| 3,277,949 | 10/1966 | Walbridge | 431—6 |
| 3,384,439 | 5/1968 | Walbridge | 431—24 |

FREDERICK L. MATTESON, JR., *Primary Examiner.*

R. A. DUA, *Assistant Examiner.*